(12) United States Patent
Vaidyanathan et al.

(10) Patent No.: US 11,875,453 B2
(45) Date of Patent: *Jan. 16, 2024

(54) DECOUPLED SHADING PIPELINE

(71) Applicant: Intel Corporation, Santa Clara, CA (US)

(72) Inventors: Karthik Vaidyanathan, Berkeley, CA (US); Marco Salvi, Seattle, WA (US); Robert M. Toth, Lund (SE)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/222,347

(22) Filed: Apr. 5, 2021

(65) Prior Publication Data

US 2021/0225066 A1 Jul. 22, 2021

Related U.S. Application Data

(63) Continuation of application No. 16/984,729, filed on Aug. 4, 2020, now Pat. No. 10,970,917, which is a continuation of application No. 16/775,321, filed on Jan. 29, 2020, now abandoned, which is a continuation of application No. 15/398,111, filed on Jan. 4, 2017, now Pat. No. 10,553,019, which is a
(Continued)

(51) Int. Cl.
*G06T 15/50* (2011.01)
*G06T 1/20* (2006.01)

(52) U.S. Cl.
CPC .............. *G06T 15/503* (2013.01); *G06T 1/20* (2013.01); *G06T 2200/12* (2013.01)

(58) Field of Classification Search
CPC ...... G06T 15/503; G06T 1/20; G06T 2200/12
See application file for complete search history.

(56) References Cited

U.S. PATENT DOCUMENTS 6,016,150 A * 1/2000 Lengyel ............... G06T 11/001
345/426
6,288,730 B1 9/2001 Duluk, Jr. et al.
(Continued)

FOREIGN PATENT DOCUMENTS

CN 1601562 A 3/2005
CN 101620725 A 1/2010
(Continued)

OTHER PUBLICATIONS

Ragan-Kelley et al., "Decoupled Sampling for Graphics Pipelines," ACM Transactions on Graphics, vol. NN, No. N, Article NN, published Mar. 2011 (17 pages).
(Continued)

*Primary Examiner* — William A Beutel
(74) *Attorney, Agent, or Firm* — Trop Pruner & Hu, P.C.

(57) ABSTRACT

In some embodiments, a given frame or picture may have different shading rates. In one embodiment in some areas of the frame or picture the shading rate may be less than once per pixel and in other places it may be once per pixel. Examples where the shading rate may be reduced include areas where there is motion and camera defocus, areas of peripheral blur, and in general, any case where the visibility is reduced anyway. The shading rate may be changed in a region, such as a shading quad, by changing the size of the region.

24 Claims, 5 Drawing Sheets

Related U.S. Application Data continuation of application No. 14/103,951, filed on Dec. 12, 2013, now Pat. No. 9,569,883.

(56) References Cited

U.S. PATENT DOCUMENTS

| | | | |
|---|---|---|---|
| 7,164,426 B1 | 1/2007 | Duluk, Jr. et al. | |
| 7,348,986 B2* | 3/2008 | Doyle | G06T 1/20 345/502 |
| 2001/0020983 A1 | 9/2001 | Lee et al. | |
| 2002/0077988 A1* | 6/2002 | Sasaki | G06F 21/10 705/59 |
| 2004/0003409 A1* | 1/2004 | Berstis | H04N 7/181 348/E7.086 |
| 2007/0024639 A1* | 2/2007 | Hastings | G06T 15/00 345/613 |
| 2008/0111833 A1* | 5/2008 | Thorn | G06F 1/3231 345/690 |
| 2008/0243279 A1 | 10/2008 | Sherman | |
| 2009/0254690 A1 | 10/2009 | Sherman et al. | |
| 2010/0001999 A1* | 1/2010 | Everitt | G06T 11/40 345/611 |
| 2010/0093401 A1 | 4/2010 | Moran et al. | |
| 2012/0281004 A1 | 11/2012 | Shebanow et al. | |
| 2013/0027404 A1* | 1/2013 | Sarnoff | G06F 3/04883 345/441 |
| 2013/0249927 A1 | 9/2013 | Brennan | |
| 2013/0257885 A1 | 10/2013 | Vaidyanathan | |
| 2013/0271465 A1 | 10/2013 | Clarberg et al. | |
| 2014/0002458 A1* | 1/2014 | Angelidis | G06T 15/005 345/426 |
| 2014/0320512 A1* | 10/2014 | Seetharamaiah | G06T 15/005 345/564 |
| 2015/0022537 A1* | 1/2015 | Lum | G06T 11/40 345/522 |
| 2015/0070355 A1 | 3/2015 | Clarberg et al. | |
| 2015/0145872 A1* | 5/2015 | Morrison | G06K 15/1857 345/505 |
| 2017/0178408 A1* | 6/2017 | Bavor, Jr. | G06F 3/017 |

FOREIGN PATENT DOCUMENTS

| | | |
|---|---|---|
| CN | 101937556 A | 1/2011 |
| KR | 20100004890 A | 1/2010 |

OTHER PUBLICATIONS

China Patent Office, Office Action dated Jan. 18, 2017 in Chinese Patent Application No. 201410635316.8 (11 pages).
China Patent Office, Office Action dated Aug. 2017 in Chinese Patent Application No. 201410635316.8 (10 pages).
China Patent Office, Office Action dated Aug. 2017 in Chinese Patent Application No. 201410635316.8 (3 pages).
China Patent Office, Office Action mailed Mar. 16, 2020 in Chinese Patent Application No. 20171058380.9 (7 pages).

* cited by examiner

DECOUPLED SHADING PIPELINE

CROSS-REFERENCE TO RELATED APPLICATION

This application is a continuation of Ser. No. 16/984,729, filed Aug. 4, 2020, now U.S. Pat. No. 10,970,917, issued Apr. 6, 2021, which is a continuation application claiming priority to U.S. patent application Ser. No. 16/775,321, filed Jan. 29, 2020, which is a continuation application of U.S. patent application Ser. No. 15/398,111, filed Jan. 4, 2017, now U.S. Pat. No. 10,553,019, issued Feb. 4, 2020, which is a continuation of U.S. patent application Ser. No. 14/103,951, filed Dec. 12, 2013, now U.S. Pat. No. 9,569,883, issued Feb. 14, 2017, hereby expressly incorporated by reference herein.

BACKGROUND

This relates generally to graphics processing.

Graphics processors are used to develop images for display on computer displays. A graphics pipeline includes a plurality of stages that develop the finished depiction. An image is rendered using rasterization by sampling different functions and shading. A visibility function is a sample point inside a triangle. Shading determines what is the color at a certain sample point. Thus, the terms "visibility samples" or "shading samples" are used hereinafter.

In super-sampling anti-aliasing (SSAA), visibility samples are the same as the shading samples. In multi-sampling anti-aliasing (MSAA), there is a single shading sample per pixel and many visibility samples per pixel. Graphics processors generally support these two anti-aliasing solutions.

BRIEF DESCRIPTION OF THE DRAWINGS

Some embodiments are described with respect to the following figures.

DETAILED DESCRIPTION

In some embodiments, a given frame or picture may have different shading rates. In one embodiment in some areas of the frame or picture the shading rate may be less than once per pixel and in other places it may be once per pixel. Examples where the shading rate may be reduced include areas where there is motion and camera defocus, areas of peripheral blur, and in general, any case where the visibility is reduced anyway. The shading rate may be changed in a region, such as a shading quad, by changing the size of the region. A screen-quad is a group of 2×2 screen pixels that is the output of the rasterizer. A shading pixel is a group of A×B screen pixels. A shading quad is a group of 2×2 shading pixels.

With decoupled pixel shading, the concept of MSAA is generalized in one of a variety of different ways. One way it can be generalized is to compute the shading at a rate lower than once a pixel, for example, once every 1×2 pixels, 2×1 pixels, 2×2 pixels, 4×2 pixels, 2×4 pixels, or 4×4 pixels, to mention some examples. It is also feasible to have a fully continuous distribution with two floating point numbers, A and B, by giving one shading sample per A×B pixels. Another variant is to split the shading into two parts so that one part is done per pixel or per sample and the other part is done at a slower rate and then the results are combined.

In modern real time graphics pipelines, pixel/fragment shading is performed at a rate of once per geometric primitive per pixel. However, there are many opportunities for reducing pixel shading rates. Such reductions can result in power consumption savings and in other performance benefits. For example, in cases where motion blur and camera defocus exists, there is an opportunity to have different shading rates in different parts of a frame. When a scene is rendered with motion and camera defocus, regions of the screen may appear blurred, so the pixel shading rate can be lower in those regions since they mostly display low frequency content. In cases of peripheral blur, shading rates can be lowered at the periphery of the screen where high frequency details are harder to perceive by the user, at least assuming the user is focusing attention at the center of the screen. Also, in higher density displays, the shading rate can be lowered without significant loss of detail.

While the shading rate can be flexibly lowered, visibility is also sampled at the full rate to preserve sharp features like edges, in some embodiments. In some embodiments, the visibility sample rate may be reduced as well, with the possibility of an adverse effect on aliasing at object edges.

Figure 1:
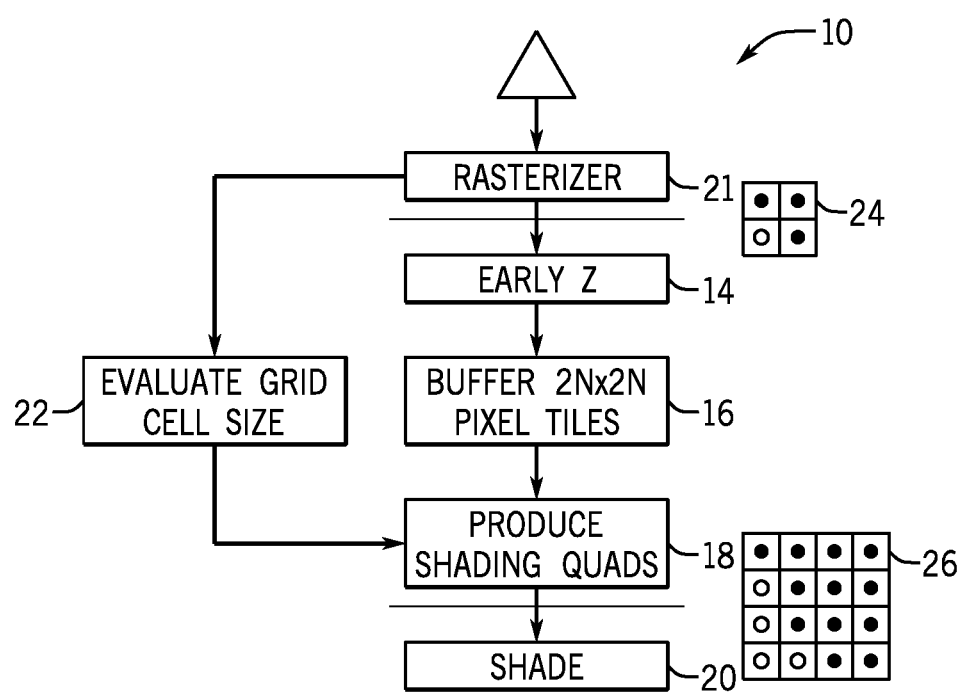
FIG. 1 is a flow chart for one embodiment of the present invention.

Referring to FIG. 1, a sequence 10 may be implemented in software, firmware and/or hardware. In software and firmware embodiments, it may be implemented by computer executed instructions stored in one or more non-transitory computer readable media, such as magnetic, optical, or semiconductor storages.

Initially, the rasterizer 21 tests primitives against pixel regions of a given size, in this example, 2×2 pixel regions 24, called quads. (Pixel regions of other sizes can also be used). The rasterizer traverses the quads in a space filling order, such as the Morton order. If the primitive covers any of the pixels or samples, in the case of multi-sampling, in the quad, as indicated in the depiction labeled covered quad, the rasterizer sends the quad downstream to a small tile buffer 16. Early z-culling may be done at 14 in some embodiments.

For a given primitive, the tile buffer may divide the screen into two 2N×2N pixel sized tiles, called shading quads, and may store all rasterized quads that fall inside a single tile as indicated in block 18. A screen aligned shading grid may be evaluated for each two 2N×2N tile (block 22).

The size of the grid cell or shading quad may be limited to, multiples of pixels in powers of two in some embodiments. For example, the cell sizes may be 1×1, 1×2, 2×1, 4×1, 4×2, 4×4, up to N×N, including 1×N and N×1 and all intermediate configurations.

By controlling the size of the shading grid cell, one can control the shading rate at block 20. That is, the bigger the cell size, the lower the shading rate for a tile.

The quads that are stored in the tile buffer are then grouped into shading quads that consist of groups of adjacent grid cells, such as 2×2, adjacent grid cells in one embodiment. The shading quads are then shaded and the outputs from the shader are written back to all covered pixels in the color buffer.

The grid size is evaluated per 2N×2N pixel tile (where N is the size of largest decoupled pixel within a resized quad and separately for each geometric primitive. The "largest decoupled pixel" refers to the size of the pixel when the size of shading quad is changed. In one embodiment four pixels form a quad and each pixel forms one quarter of the quad size.

The grid size can be controlled by an attribute called the scale factor that includes a pair of signed values—the scale factor along the X axis, $S_x$, and the scale factor along the Y axis, $S_y$. The scale factor can be assigned in various ways. For example, it can be interpolated from vertex attributes or computed from the screen position.

Using signed scale factors can be useful, for example, in the case of camera defocus, if a primitive crosses the focus plane. In this case, the vertices of a primitive can be out of focus while the interior of the primitive may be in focus. Then one can assign negative scale factors as attributes for vertices that are in front of the focal plane and positive scale factors as attributes for vertices behind the focal plane and vice versa. For the regions of the primitive that are in focus, the scale factor interpolates to zero and, therefore, maintains high shading rates in the in-focus regions.

The scale factors can vary inside a tile, while a single quantized grid cell size is still computed for each tile. This may produce discontinuities in the grid sizes moving from tile-to-tile and can result in visible grid transitions.

Figure 2:
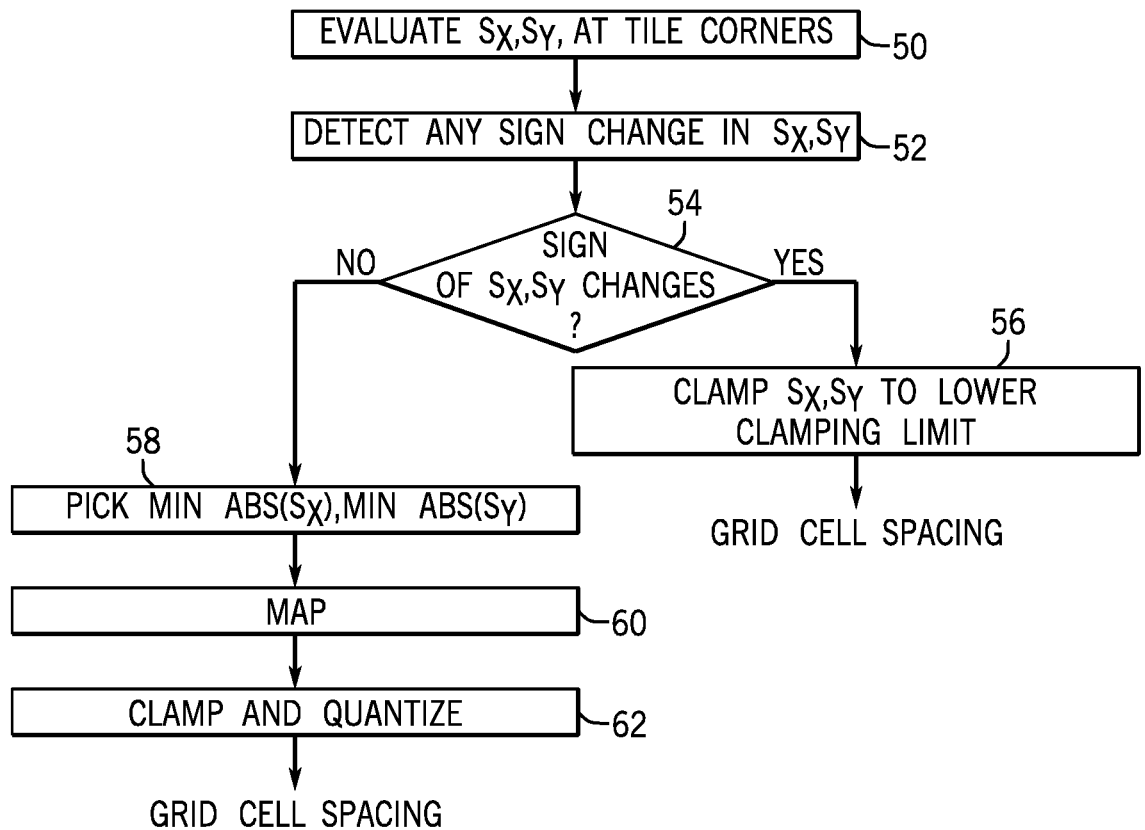
FIG. 2 is a flow chart for another embodiment.

FIG. 2 is a flow chart for a sequence according to one embodiment. The sequence may be implemented in software, firmware and/or hardware. In software and firmware embodiments, it may be implemented by computed executed instructions stored in one or more non-transitory computer readable media, such as magnetic, optical, or semiconductor storages.

In order to compute the grid size from the scale factor, the scale factor is first interpolated at the four corners of a 2N×2N tile (block 50). If there is a sign change across the four corners of the grid cell (blocks 52 and 54), this indicates a minimum value inside the tile. In this case, the minimum possible grid cell spacing is selected, which may typically be one pixel. Then $S_x$ and $S_y$ are clamped to a lower clamping limit (block 56). If there is no sign change, the minimum absolute value of the scale factor is selected from the four corners (block 58). For some implementations, operations other than the minimum may be used, for instance the average of the absolute values. The quad size then undergoes an affine mapping (block 60), followed by clamping and quantization (block 62), to determine the grid cell size.

Figure 3:
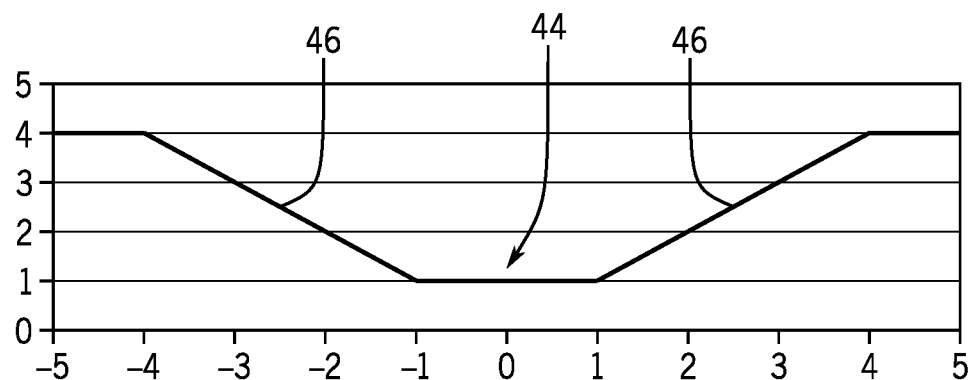
FIG. 3 is a graph of grid cell size with respect to X and Y scale factors.

The X and Y scale factors are defined over the real line and independently mapped to X and Y grid cell size by a convex or tub function as shown in FIG. 3 with inclined sides 46 and horizontal bottom 44. Other functions may be used in other embodiments. Grid cells smaller than a single screen space pixel may not be supported, in some embodiments, and, in these cases, the grid cell size is never smaller than one.

The convex function or tub function maps the scale factors that are useful in determining how the quad size changes and therefore how the shading sampling rate changes. Specifically the tub function maps the scale factors to a discrete pixel size. The scale factors are used to determine the quad's actual physical screen size. As used herein, a tub function is any function that reduces then increases a pixel region (such as a shading quad) size in order to change the shading rates.

A value comes from the graphics pipeline as an input to the rasterizer which is used to set the scale factor. For example, the input may come from a vertex shader or it may be implemented at an application program interface level. It may also come from fixed function hardware. The input tells the system, for some point on the screen, or for some primitive, what should be the value for the quad size. Thus in FIG. 3, the input value tells what the scale factor would be relative to the flat bottom portion of the tub function. It maps the size of the quad into a physical screen size.

In some embodiments, the mapping may be to a physical screen size in terms of powers of two. The use of powers of two simplifies the hardware implementation.

Advantageously at the transition point, the scale factor is relatively small and on either side of the transition point, indicated by the bottom of the tub, the scale factor is larger. Thus as an example, when an object is in focus at zero on the x axis, it may be out of focus at greater and lesser depths. Thus in one embodiment at depths less than the plane in which the object is in focus the scale factor may be considered negative, and at depths greater than that zero depth level, the scale factor may be positive.

One use case for the tub function may involve an attribute computed per vertex. A triangle may be subject to defocus, with the region in focus at one depth, indicated at zero in the tub function on the x axis, and the region may be out of focus at lesser and greater depths. The more blurry the triangle is, the less often it may be shaded and hence the tub function provides a tool for making this transition. The tub function provides a way to linearly interpolate and also to go from negative on one side of the focus plane to zero at focus and to a positive number on the other side. Thus with the tub function, the pixel size is larger on one side of the focus plane, and then it gets smaller at the focus plane, and then it gets larger on the other side of the focus plane.

The x axis of the tub function indicates any property interpolated across individual triangles in one embodiment. In the example described above, the x axis is a measure of depth. But it could be any other property such as the distance across the screen in an example with peripheral blurring. The tub function is one way to change the quad size but there are other functions and other inputs that can be used to implement the scale factors in other embodiments.

However, a property that is not interpolated across triangles may also be used. For example in the case of peripheral blur, it may simply be a value based on the screen coordinate which can be computed by fixed function hardware.

To provide more flexibility, the affine mapping and clamping function may be governed by two parameters:

float2 ShaderPixelSize=1+max(0,(abs(ScaleFactor)−A)*B);

where A controls the width of the flat region 44, while B controls the slope of the left and right ramps 46.

The X and Y components of the grid cell size may be clamped to a finite interval [1,M], where M is a power of two between [1,N].

In order to not allow shading quads to overlap regions of the screen that map to different shading processors, the size of the grid cell determined by the tub function may be quantized to produce physical sizes in powers of two (i.e. 1, 2, 4, etc.) in some embodiments. This avoids reshading the same quad multiple times. This choice also minimizes the amount of information exchanged between shading processors. There are at least two methods for quantizing the grid cell size to a power of two: round and floor. An example pseudo-code for the case where N=4 is as follows:

```
//Default Quantized SP Size
QuantizedCellSize=1 ;
switch (QuantizationMode) {
caseRound:
        if (ScaleFactor >= 3.f) QuantizedCellSize = 4.f;
        else if (ScaleFactor > 1.5f) QuantizedCellSize = 2.f;
        break;
caseFloor:
        if (ScaleFactor >= 4.f) QuantizedCellSize = 4.f;
        else if (ScaleFactor >= 2.f) QuantizedCellSize = 2.f;
        break;
default:
        break;
}
```

The input value such as an input from the vertex shader, an input from the user, an input from an API, or any input from further up the graphics pipeline, may be used to determine the adjusted quad size. In one embodiment, the input value may change smoothly and yet the quad size may not adjust in a similarly smooth fashion. This is because of the effects of quantization to factors of two. In some embodiments, these discontinuities that result from the difference between what the input value dictates should be the quad size and the actual quad size, as quantized, may become visible on the screen.

In some embodiments this screen effect may be compensated for by modifying the texture level of detail (LOD) to compensate for the error produced by the quantization. More specifically, by blurring the textures by an amount that corresponds to the amount by which the input value suggested quad size differs from the actual quad size, these discontinuities can be made relatively hard to see. Thus in some embodiments, an adjustment of the texture coordinates may be made according to the ratio of the desired size that was specified by the input value from upstream to the actual resulting quantized size.

The scale factors can vary smoothly inside a tile. However, a quantized grid cell size may be evaluated once for each tile. This may produce discontinuities in the grid size moving from tile to tile. To compensate these discontinuities, the texture sample or level of detail calculation may be enhanced to reflect the actual, un-quantized sampling rate. This may be done by scaling the finite differences that are used to compute the level of detail for a given set of texture coordinates:

Finite_Difference_new=Finite_Different_Old*(Desired_Cell_Size/Quantized_Cell_Size)

The un-quantized desired cell size may be evaluated at a fine granularity, such as 2×2 pixel regions, and a compensation may be applied at this fine granularity. This may create a smooth variation in image detail, masking the discontinuities in grid size.

While a two dimensional example is given, three dimensional implementations are also contemplated. In one embodiment, three dimensional spaces may be flattened to two dimensional shading spaces. Three and higher dimensional spaces with decoupling of the visibility space from the shading space are also contemplated.

Figure 4:
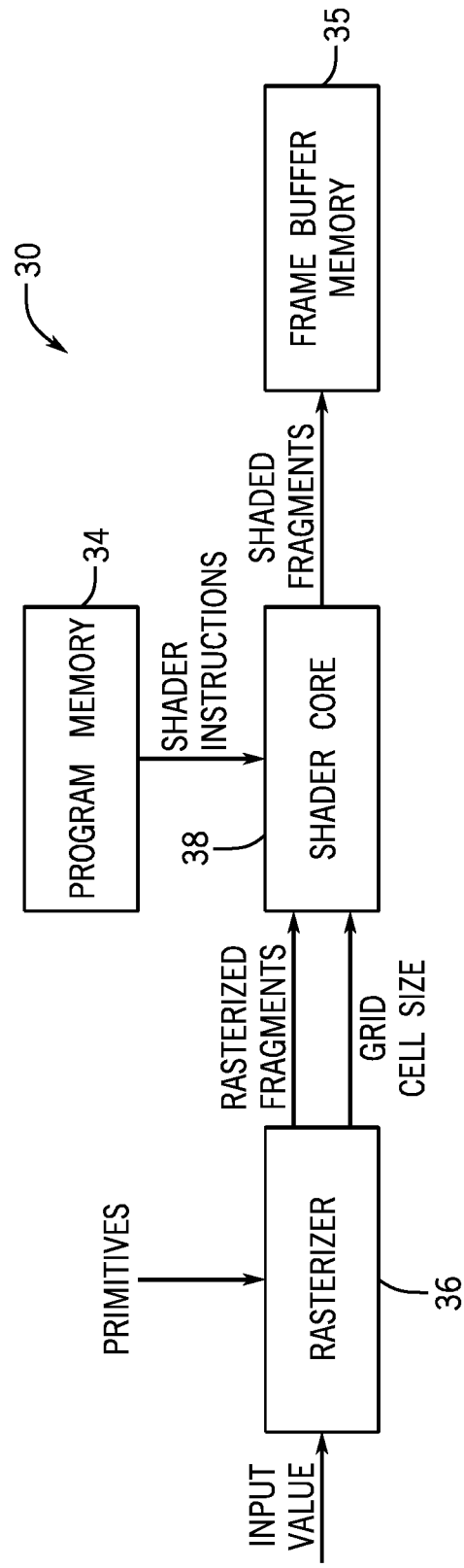
FIG. 4 is a depiction of a graphics pipeline according to one embodiment.

Referring to FIG. 4, when a program running on a host processor initiates a draw call, the graphics pipeline 30 processes the draw call. One primitive is rasterized at a time. The rasterizer 36 generates fragments and also generates in one embodiment, a grid cell size. The grid cell size is used in the shader core 38. A program memory 34 stores the instructions for the shader core 38. The shader core outputs the shaded fragments to a frame buffer memory 35.

Figure 5:
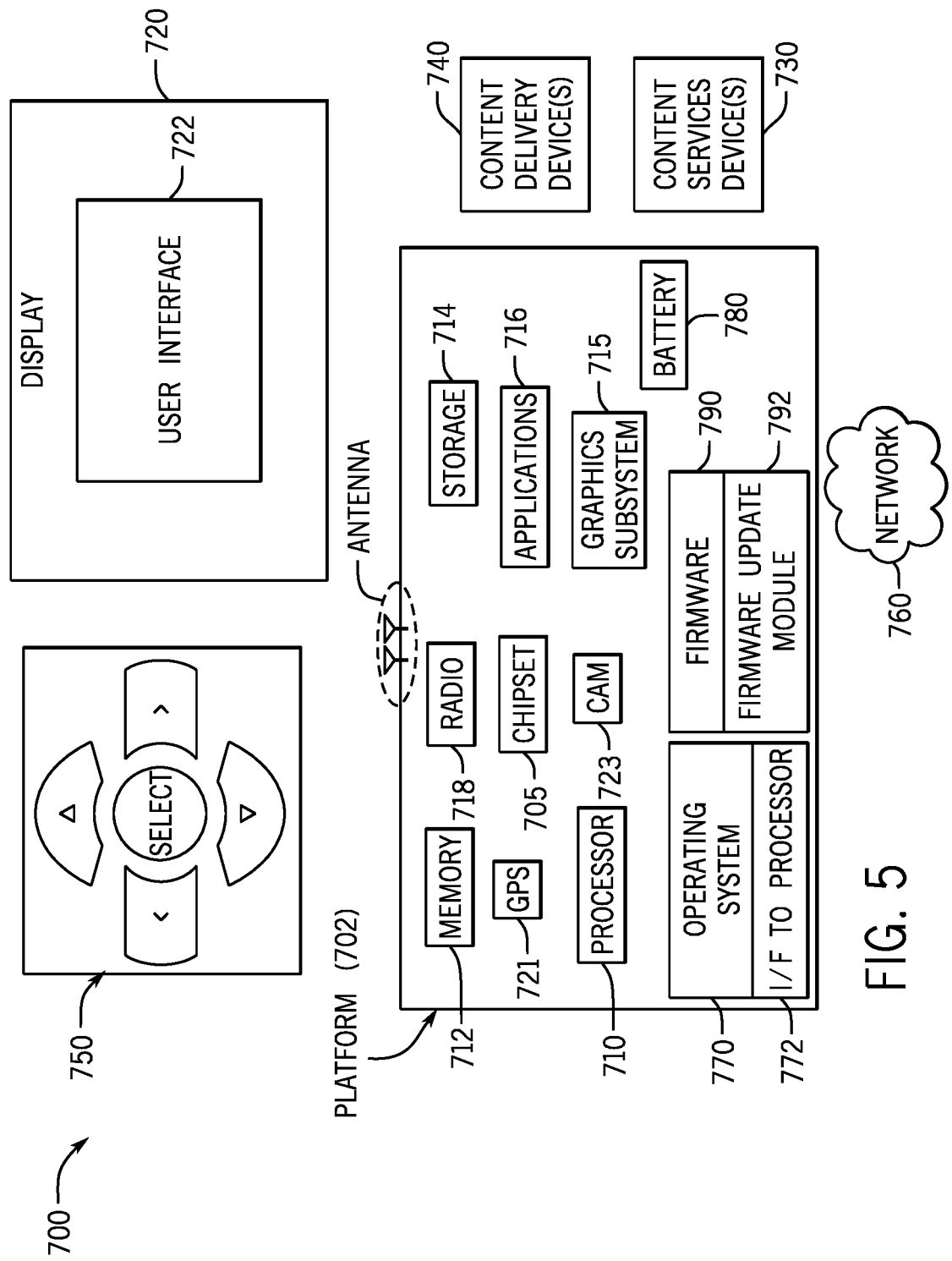
FIG. 5 is a system depiction for one embodiment.

FIG. 5 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequences of FIGS. 1 and 2, together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the disclosure.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
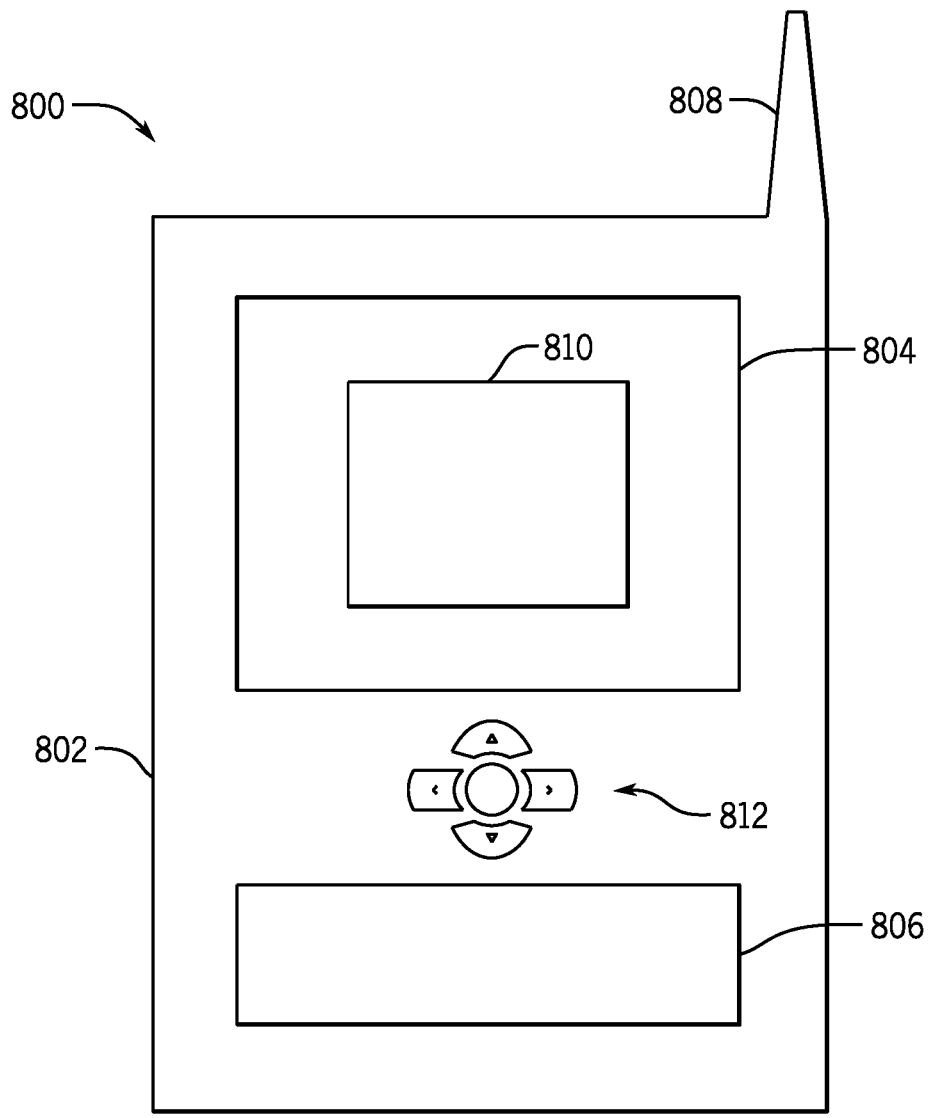
FIG. 6 is a front elevational view of the embodiment shown in FIG. 4.

As described above, system 700 may be embodied in varying physical styles or form factors. FIG. 6 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIGS. 1 and 2 in software and/or firmware embodiments.

As shown in FIG. 6, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The following clauses and/or examples pertain to further embodiments:

One example embodiment may be a method comprising using a processor to alter the shading rate in one region of a picture or frame relative to another region by resizing at least one of said regions. The method may also include changing the size of a shading quad. The method may also include using a tub function to resize a region. The method may also include quantizing a region size based on a power of two. The method may also include changing a texture level of detail to compensate for quantization. The method may also include setting a grid size based on a pair of signed scale factors, one for a first direction and the other for a transverse direction. The method may also include evaluating a grid size per 2N×2N pixel tile, where N is a size of the largest decoupled pixel. The method may also include interpolating a scale factor in each of four corners of a 2N×2N tile and determining whether there is a sign change across the four corners of a grid cell. The method may also include if there is a sign change, selecting a minimum possible grid cell spacing. The method may also include wherein if there is no sign change, selecting the minimum absolute value of the scale factor is from the four corners.

Another example embodiment may be at least one or more non-transitory computer readable media storing instructions for execution by one or more processors to perform in a sequence comprising using a processor to alter the shading rate in one region of a picture or frame relative to another region by resizing at least one of said regions. The media may further store instructions to perform the sequence including changing the size of a shading quad. The media may further store instructions to perform the sequence including using a tub function to resize a region. The media may further store instructions to perform the sequence including quantizing a region size based on a power of two. The media may further store instructions to perform the sequence including changing a texture level of detail to compensate for quantization. The media may further store instructions to perform the sequence including setting a grid size based on a pair of signed scale factors, one for a first direction and the other for a transverse direction. The media may further store instructions to perform the sequence including evaluating a grid size per 2N×2N pixel tile, where N is a size of the largest decoupled pixel. The media may further store instructions to perform the sequence including interpolating a scale factor in each of four corners of a 2N×2N tile and determining whether there is a sign change across the four corners of a grid cell. The media may further store instructions to perform the sequence including if there is a sign change, the sequence includes selecting a minimum possible grid cell spacing. The media may further store instructions to perform the sequence including if there is no sign change, the sequence includes selecting the minimum absolute value of the scale factor is from the four corners.

In another example embodiment may be an apparatus comprising a processor to alter the shading rate in one region of a picture or frame relative to another region by resizing at least one of said regions and a memory coupled to said processor. The apparatus may include said processor to change the size of a shading quad. The apparatus may include said processor to use a tub function to resize a region. The apparatus may include said processor to quantize a region size based on a power of two. The apparatus may include said processor to change a texture level of detail to compensate for quantization. The apparatus may include said processor to set a grid size based on a pair of signed scale factors, one for a first direction and the other for a transverse direction. The apparatus may include said processor to evaluate a grid size per 2N×2N pixel tile, where N is a size of the largest decoupled pixel. The apparatus may include said processor to include a display communicatively coupled to the processor, a battery coupled to the processor and firmware and a module to update said firmware.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A system comprising:
   a processor; and
   a machine-readable storage storing instructions, the instructions executable by the processor to:
   partition an image into at least a first region and a second region, wherein the first region is a peripheral region of the image;
   prior to a display of the image on a display device, map a first render rate of a plurality of render rates to the peripheral region of the image;
   prior to the display of the image on the display device, map a second render rate of the plurality of render rates to the second region of the image, wherein the second render rate is higher than the first render rate;
   prior to the display of the image on the display device, perform rendering in the first region at the first render rate mapped to the peripheral region; and
   prior to the display of the image on the display device, perform rendering in the second region at the second render rate mapped to the second region.

2. The system of claim 1, wherein the first rate is 0.25 per pixel, and wherein the second rate is 1 per pixel.

3. The system of claim 1, wherein the first rate is 0.5 per pixel, and wherein the second rate is 1 per pixel.

4. The system of claim 1, further comprising the display device to display an image comprising the first region and the second region.

5. The system of claim 4, further comprising:
   a touch input device; and
   a flash memory device.

6. The system of claim 5, further comprising:
   an antenna; and
   a wireless radio device.

7. The system of claim 6, further comprising:
   a battery device.

8. A non-transitory machine-readable medium storing instructions that upon execution cause a processor to:
   partition an image into at least a first region and a second region, wherein the first region is a peripheral region of the image;
   prior to a display of the image on a display device, map a first render rate of a plurality of render rates to the peripheral region of the image;
   prior to the display of the image on the display device, map a second render rate of the plurality of render rates to the second region of the image, wherein the second render rate is higher than the first render rate;
   prior to the display of the image on the display device, perform rendering in the first region at the first render rate mapped to the peripheral region; and
   prior to the display of the image on the display device, perform rendering in the second region at the second render rate mapped to the second region.

9. The non-transitory machine-readable medium of claim 8, wherein the first rate is 0.25 per pixel, and wherein the second rate is 1 per pixel.

10. The non-transitory machine-readable medium of claim 8, wherein the first rate is 0.5 per pixel, and wherein the second rate is 1 per pixel.

11. The non-transitory machine-readable medium of claim 8, further comprising instructions that upon execution cause the processor to:
    display an image comprising the first region and the second region on the display device, wherein the display device is included in a portable computing device.

12. A graphics processor comprising:
    a graphics processing pipeline implemented in hardware, the graphics processing pipeline to:
    partition an image into at least a first region and a second region, wherein the first region is a peripheral region of the image;
    prior to a display of the image on a display device, map a first shading rate of a plurality of shading rates to the peripheral region of the image;
    prior to the display of the image on the display device, map a second shading rate of the plurality of shading rates to the second region of the image, wherein the second shading rate is higher than the first shading rate;

prior to the display of the image on the display device, shade the first region at the first shading rate mapped to the peripheral region; and prior to the display of the image on the display device, shade the second region at the second shading rate mapped to the second region.

13. The graphics processor of claim 12, the graphics processing pipeline to:

generate tiles of multiple pixels in the first region and the second region.

14. The graphics processor of claim 13, the graphics processing pipeline to:

buffer the tiles of multiple pixels in a tile buffer.

15. The graphics processor of claim 14, the graphics processing pipeline to:

define a shading grid for at least one tile in the tile buffer.

16. The graphics processor of claim 15, the graphics processing pipeline to:

shade the at least one tile according to the defined shading grid.

17. The graphics processor of claim 16, wherein dimensions of the at least one tile are eight pixels by eight pixels.

18. A method comprising:

partitioning, by a graphics processor, an image into at least a first region and a second region, wherein the first region is a peripheral region of the image;

prior to a display of the image on a display device, mapping a first shading rate of a plurality of shading rates to the peripheral region of the image;

prior to the display of the image on the display device, mapping a second shading rate of the plurality of shading rates to the second region of the image;

prior to the display of the image on the display device, shading, by the graphics processor, the first region at the first shading rate mapped to the peripheral region; and prior to the display of the image on the display device, shading, by the graphics processor, the second region at the second shading rate mapped to the second region.

19. The method of claim 18, comprising:

defining a shading grid for at least one tile in a tile buffer.

20. The method of claim 19, comprising:

shading the at least one tile according to the defined shading grid.

21. A non-transitory computer readable storage medium storing executable instructions, the instructions when executed by one or more processors causing the one or more processors to:

receive an image to be rendered;

prior to a display of the image on a display device, map a first render rate of a plurality of render rates to a peripheral region of the image, wherein the peripheral region is a first region of the image;

prior to the display of the image on the display device, map a second render rate of the plurality of render rates to a second region of the image;

prior to the display of the image on the display device, perform rendering in the first region at the first render rate mapped to the peripheral region; and prior to the display of the image on the display device, perform rendering in the second region at the second render rate mapped to the second region.

22. The non-transitory machine-readable medium of claim 21, wherein the first render rate is 0.25 per pixel, and wherein the second render rate is 1 per pixel.

23. The non-transitory machine-readable medium of claim 21, wherein the first render rate is 0.5 per pixel, and wherein the second render rate is 1 per pixel.

24. The non-transitory machine-readable medium of claim 21, the instructions when executed by the one or more processors causing the one or more processors to:

display the first region and the second region of the image on the display device, wherein the display device is included in a portable computing device.

* * * * *